(12) United States Patent
Patel et al.

(10) Patent No.: US 10,678,011 B2
(45) Date of Patent: *Jun. 9, 2020

(54) TELECOMMUNICATIONS CHASSIS AND MODULE

(71) Applicants: CommScope Technologies LLC, Hickory, NC (US); CommScope Connectivity UK Limited, Dorcan, Swindon (GB)

(72) Inventors: Kamlesh G. Patel, Chanhassen, MN (US); John Paul Anderson, Eden Prairie, MN (US); Christopher Charles Taylor, Cheltenham Glos (GB); David Patrick Murray, Bristol (GB)

(73) Assignees: CommScope Technologies LLC, Hickory, NC (US); CommScope Connectivity UK Limited, Dorcan, Swindon (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/377,783

(22) Filed: Apr. 8, 2019

(65) Prior Publication Data

US 2019/0302386 A1 Oct. 3, 2019

Related U.S. Application Data

(63) Continuation of application No. 15/565,103, filed as application No. PCT/US2016/027342 on Apr. 13, 2016, now Pat. No. 10,254,497.

(Continued)

(51) Int. Cl.
*G02B 6/44* (2006.01)
*G02B 6/38* (2006.01)

(52) U.S. Cl.
CPC ......... *G02B 6/4455* (2013.01); *G02B 6/3897* (2013.01); *G02B 6/4452* (2013.01)

(58) Field of Classification Search
None
See application file for complete search history.

(56) References Cited

U.S. PATENT DOCUMENTS

| 4,840,449 A | 6/1989 | Ghandeharizadeh |
| 4,900,123 A | 2/1990 | Barlow et al. |

(Continued)

FOREIGN PATENT DOCUMENTS

| DE | 93 13 886 U1 | 10/1993 |
| EP | 0 341 027 A2 | 11/1989 |

(Continued)

OTHER PUBLICATIONS

International Search Report and Written Opinion of the International Searching Authority for corresponding International Patent Application No. PCT/US2016/027342 dated Jul. 28, 2016, 10 pages.

(Continued)

*Primary Examiner* — Michael Stahl
(74) *Attorney, Agent, or Firm* — Merchant & Gould P.C.

(57) ABSTRACT

A telecommunications system (14) includes a chassis (12) defining a front (18), a rear (16), and a plurality of first signal connection locations (38) adjacent the rear (16). A plurality of removable cassettes (10) are housed within the chassis (12), each including a cassette body (68) defining a fixed portion (80) that is coupled to one of the first signal connection locations (38) on the chassis (12) and a movable portion (82) that telescopically slides relative to the fixed portion (80), wherein the movable portion (82) is configured for movement in a direction from the front (18) to the rear (16) of the chassis (12), each cassette (10) defining a (Continued)

plurality of second signal connection locations (58). A cable (24) between the fixed portion (80) and the movable portion (82) extends out from the movable portion (82) when that portion (82) is pulled forwardly to an extended position and is retracted into the cassette body (68) when the movable portion (82) is pushed rearwardly relative to the fixed portion (80).

18 Claims, 8 Drawing Sheets

Related U.S. Application Data

(60) Provisional application No. 62/146,649, filed on Apr. 13, 2015.

(56) References Cited

U.S. PATENT DOCUMENTS

| | | | |
|---|---|---|---|
| 5,066,149 A | 11/1991 | Wheeler et al. | |
| 5,966,492 A | 10/1999 | Bechamps et al. | |
| 6,614,979 B2 | 9/2003 | Bourdeau | |
| 6,707,978 B2 | 3/2004 | Wakileh et al. | |
| 6,925,241 B2 | 8/2005 | Bohle et al. | |
| 7,493,002 B2 | 2/2009 | Coburn et al. | |
| 7,593,613 B1 | 9/2009 | Clark | |
| 8,059,932 B2 | 11/2011 | Hill et al. | |
| 8,886,335 B2 | 11/2014 | Pianca et al. | |
| 9,075,203 B2 | 7/2015 | Holmberg | |
| 9,488,795 B1 | 11/2016 | Lane et al. | |
| 10,254,497 B2 * | 4/2019 | Patel | G02B 6/3897 |
| 2010/0054683 A1 | 3/2010 | Cooke et al. | |
| 2010/0054685 A1 | 3/2010 | Cooke et al. | |
| 2010/0296790 A1 | 11/2010 | Cooke et al. | |
| 2010/0322582 A1 | 12/2010 | Cooke et al. | |
| 2014/0086545 A1 | 3/2014 | Ott et al. | |
| 2014/0133810 A1 | 5/2014 | Schneider et al. | |
| 2014/0270676 A1 | 9/2014 | Solheid et al. | |
| 2014/0334790 A1 | 11/2014 | Zhang | |
| 2016/0041357 A1 | 2/2016 | White et al. | |
| 2016/0231525 A1 | 8/2016 | Murray et al. | |

FOREIGN PATENT DOCUMENTS

| | | |
|---|---|---|
| GB | 2 293 891 A | 4/1996 |
| WO | 2011/094327 A1 | 8/2011 |
| WO | 2011/100613 A1 | 8/2011 |
| WO | 2013/052854 A2 | 4/2013 |
| WO | 2013/106820 A1 | 7/2013 |
| WO | 2014/052441 A1 | 4/2014 |
| WO | 2014/052446 A1 | 4/2014 |
| WO | 2015/040211 A1 | 3/2015 |
| WO | 2016/012295 A1 | 1/2016 |

OTHER PUBLICATIONS

Extended European Search Report for corresponding European Patent Application No. 16780656.1 dated Nov. 2, 2018, 9 pages.

* cited by examiner

TELECOMMUNICATIONS CHASSIS AND MODULE

CROSS-REFERENCE TO RELATED APPLICATION

This application is continuation of U.S. patent application Ser. No. 15/565,103, filed on Oct. 6, 2017, now U.S. Pat. No. 10,254,497, which is a National Stage Application of PCT/US2016/027342, filed on Apr. 13, 2016, which claims the benefit of U.S. Patent Application Ser. No. 62/146,649, filed on Apr. 13, 2015, the disclosures of which are incorporated herein by reference in their entireties. To the extent appropriate, a claim of priority is made to each of the above disclosed applications.

BACKGROUND

As demand for telecommunications services increases, fiber optic networks are being extended in more and more areas. Management of the cables, ease of installation, and ease of accessibility for later management are important concerns. As a result, there is a need for fiber optic devices which address these and other concerns.

SUMMARY

An aspect of the present disclosure relates to fiber optic devices in the form of fiber optic cassettes and chassis for housing such cassettes, wherein each cassette includes at least one connector that provides a signal entry location and at least one connector that provides a signal exit location. A ribbon cable extending from the at least one connector at the signal entry location toward the at least one connector at the signal exit location is managed internally within the body of the cassette.

In certain embodiments, the cassette includes a fixed portion that is optically coupled to a backplane of a telecommunications chassis. The cassette further includes a telescopically movable portion that moves together with trays/blades that are slidable on the chassis, wherein the trays/blades support the cassettes. The ribbon cable that includes optical fibers for relaying fiber optic signals from the fixed portion of the cassette to the movable portion of the cassette extends out of the cassette body when the movable portion of the cassette is telescopically pulled out (via the trays/blades). The ribbon cable retracts into the cassette body and is managed internally via spools within the interior of the cassette body when the movable portion is moved back into the chassis via the trays/blades. The chassis, along with the cassettes housed within the chassis, form a part of the telecommunications system of the present disclosure.

According to another aspect of the present disclosure, a telecommunications system comprises a chassis defining a front, a rear, and a plurality of first signal connection locations provided adjacent the rear, a plurality of removable cassettes housed within the chassis, each cassette including a cassette body defining a fixed portion that is coupled to one of the first signal connection locations provided on the chassis and a movable portion that telescopically slides with respect to the fixed portion, wherein the movable portion of the cassette is configured for movement in a direction extending from the front to the rear of the chassis, wherein each cassette defines a plurality of second signal connection locations, and wherein a cable extending between the fixed portion and the movable portion extends out from the movable portion when the movable portion is pulled forwardly to an extended position and the cable is retracted into and managed internally within the cassette body when the movable portion is pushed rearwardly with respect to the fixed portion.

According to another aspect of the present disclosure, a fiber optic cassette comprises a cassette body defining a fixed portion that is configured to be fixedly coupled to a telecommunications chassis, wherein the fixed portion defines a fiber optic connector for optically mating with a fiber optic adapter of the chassis, a movable portion that telescopically slides with respect to the fixed portion, and a plurality of fiber optic connection locations defined on the movable portion of the cassette body, wherein a cable extending from the fiber optic connector at the fixed portion toward the movable portion extends out from the movable portion when the movable portion is pulled away from the fixed portion, and the cable is retracted into and managed internally within the cassette body when the movable portion and the fixed portion are brought together.

According to another aspect of the present disclosure, a fiber optic cassette comprises a cassette body defining a fixed portion that is configured to be fixedly coupled to a telecommunications chassis, wherein the fixed portion defines a fiber optic connector for optically mating with a fiber optic adapter of the chassis and a movable portion that telescopically slides with respect to the fixed portion, a plurality of fiber optic adapters defined on the movable portion of the body, wherein a ribbon cable extending from the fiber optic connector at the fixed portion toward the movable portion extends out from the movable portion when the movable portion is pulled away from the fixed portion, and the ribbon cable is retracted into and managed internally within the cassette body when the movable portion and the fixed portion are brought together, wherein the ribbon cable carries a plurality of fibers that extend to the fiber optic adapters defined on the movable portion of the cassette body, wherein the cassette includes a transition fiber array defined by a polymeric substrate that supports the plurality of fibers extending from the ribbon cable toward the fiber optic adapters of the movable portion of the cassette body, the fiber optic adapters each configured to mate a standard fiber optic connector to a non-conventional fiber optic connector that is terminated to one of the fibers extending from the ribbon cable and supported by the polymeric substrate.

According to another aspect of the present disclosure, a method of managing a cable extending from a fiber optic connection location provided on a chassis toward a fiber optic cassette that is slidable within the chassis comprises moving the fiber optic cassette toward an extended position away from the chassis to expose the cable, and moving the fiber optic cassette toward a retracted position in the chassis and automatically spooling the cable within the fiber optic cassette as the fiber optic cassette is moved.

According to yet another aspect of the present disclosure, a telecommunications system comprises a chassis defining a front, a rear, and a plurality of first signal connection locations, a plurality of cassettes housed within the chassis, at least a portion of each cassette slidably movable in a direction extending from the front to the rear of the chassis, wherein each cassette defines a plurality of second signal connection locations, and wherein a cable extending between one of the first signal connection locations of the chassis and the movable portion of the cassette extends out from the movable portion when the movable portion is pulled forwardly to an extended position, and the cable is retracted into and managed internally within the cassette when the movable portion is pushed rearwardly to a retracted position.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
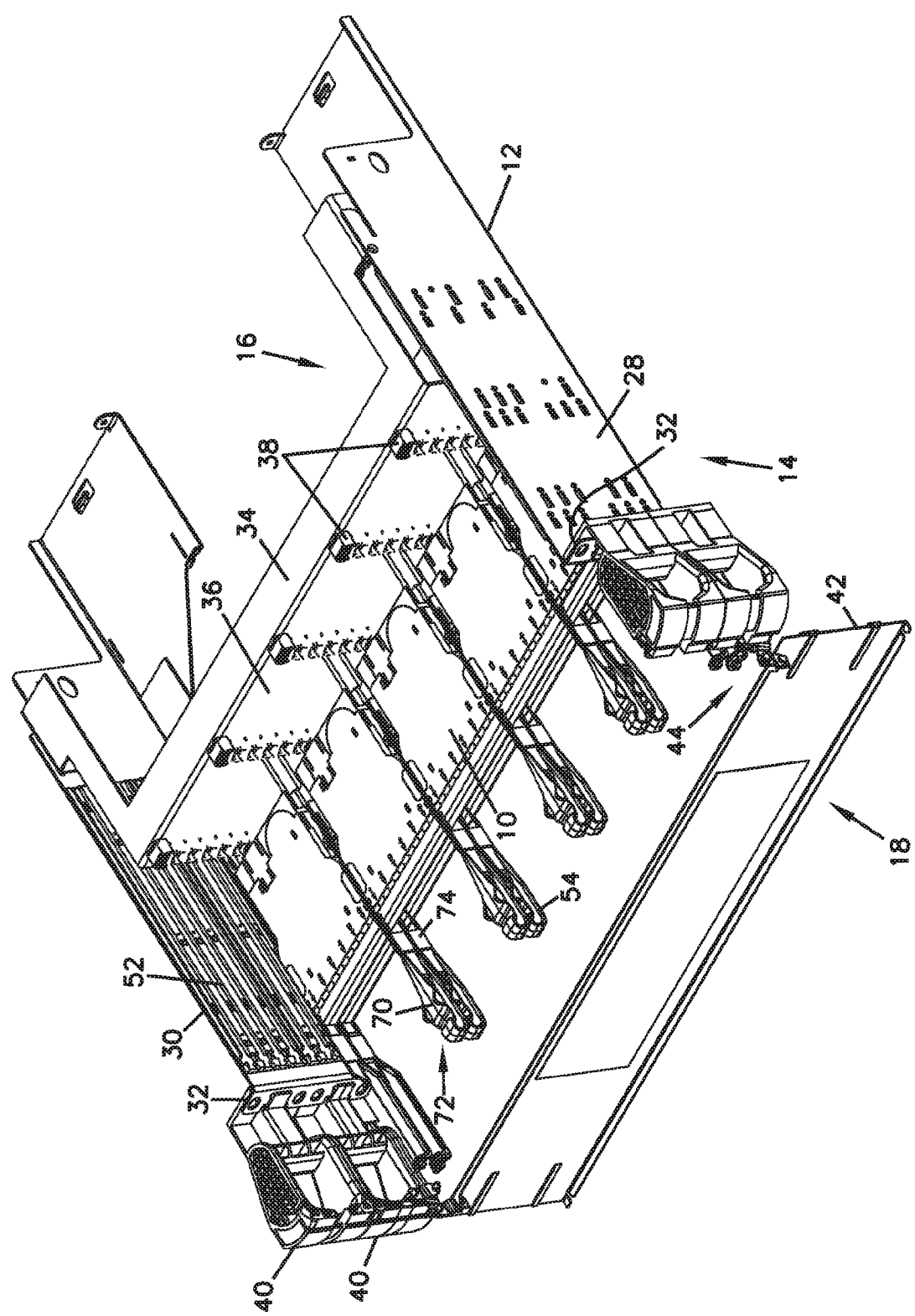
FIG. 1 is a top, front, right side perspective view of a fiber optic telecommunications system having features that are examples of inventive aspects in accordance with the present disclosure, the system including a telecommunications chassis that is configured to be mounted on a telecommunications rack, at least one tray or blade slidably mounted on the telecommunications chassis, and at least one fiber optic cassette removably mounted on the blade, wherein the fiber optic cassette includes a fixed portion that is coupled to the chassis and a telescopically movable portion that moves with the pull-out trays/blades.

The present disclosure is directed generally to fiber optic devices in the form of fiber optic cassettes 10 and telecommunications chassis 12 configured to house such fiber optic cassettes 10, wherein the chassis 12 and the cassettes 10 form a part of a telecommunications system 14 of the present disclosure. The cassettes 10 may be removable, replaceable, modular units.

As will be described in further detail below, the fiber optic cassettes 10 of the present disclosure are designed to relay signals input adjacent a rear 16 of the chassis 12 toward connection locations adjacent a front 18 of the chassis 12 for further distribution.

Each cassette 10 houses and directs multiple fibers which terminate at a rear connector 92, such as an MPO style connector, to a plurality of adapters 58 positioned at a generally front portion of the cassette 10. The fiber optic cassettes 10 of the present disclosure are designed to internally manage the cabling 24 carrying the fibers as trays/blades 26 supporting the cassettes 10 move between an extended position and a retracted position.

According to certain embodiments, the fiber optic cassettes 10 of the present disclosure provide a transition housing or support between multi-fibered connectors, such as MPO style connectors having MT ferrules, and single or dual fiber connectors, such as LC or SC type connectors, wherein that transition housing or support includes features for internally managing cabling 24 as the cassettes 10 move between the extended and retracted positions.

Figure 2:
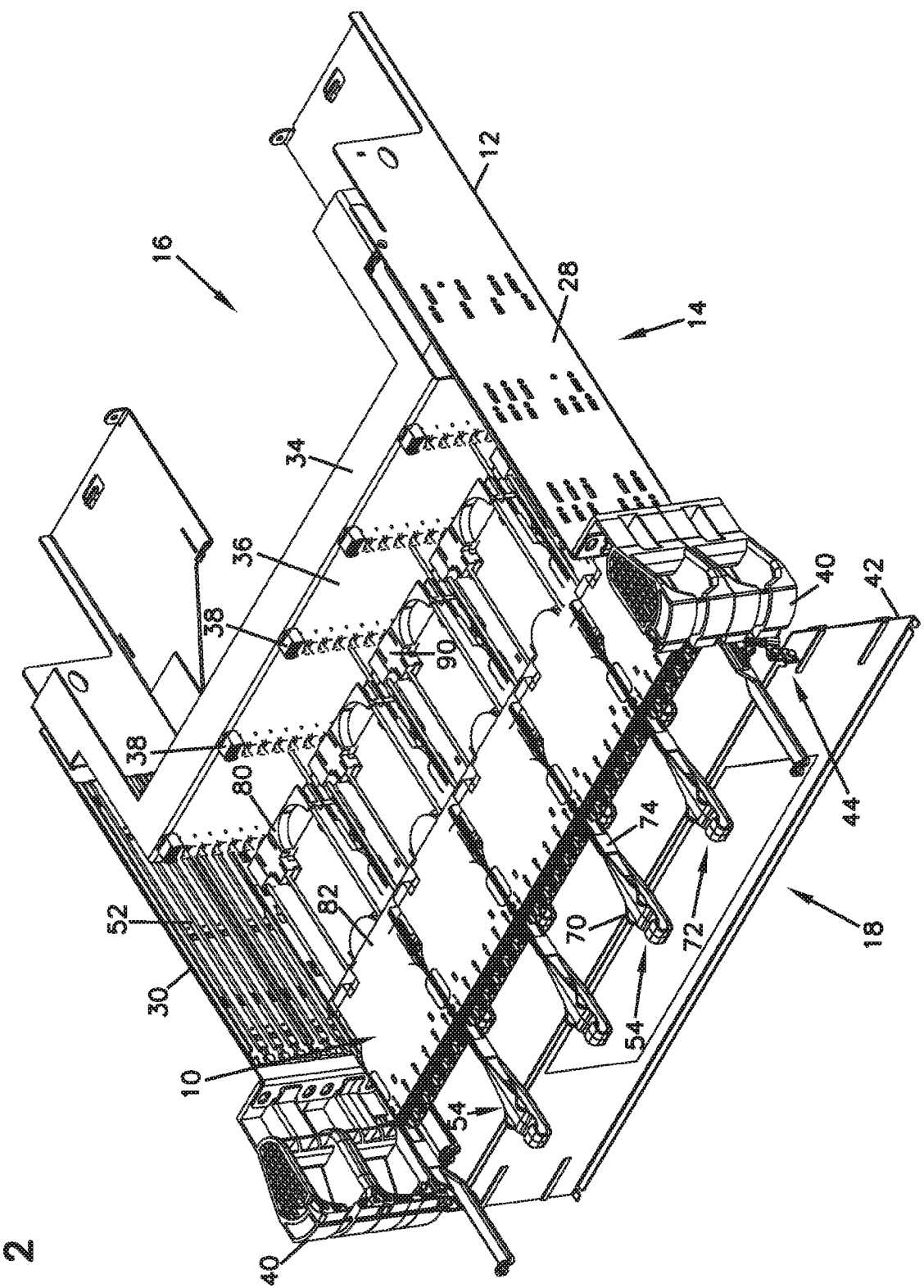
FIG. 2 illustrates the telecommunications system of FIG. 1 with one of the trays in the extended position, wherein the movable portions of the cassettes that are supported by the tray have also been telescopically extended.

Referring now to FIGS. 1-2, a fiber optic telecommunications system 14 having features that are examples of inventive aspects in accordance with the present disclosure is illustrated. The system 14 includes a telecommunications chassis or panel 12 configured to be mounted on a telecommunications rack. In the depicted embodiment, the chassis 12 is sized to be mountable on a standard 19-inch telecommunications rack.

According to the depicted embodiment, the chassis 12 is defined by a right wall 28 and a left wall 30. The right and left walls 28, 30 define mounting flanges 32 adjacent a front 18 of the chassis 12 for mounting the chassis 12 to a telecommunications rack.

Adjacent a rear 16 of the chassis 12, a back wall 34 extends between the right and left walls 28, 30 of the chassis 12. The back wall 34 defines a fiber optic backplane 36 consisting of a plurality of fiber optic adapters 38 arranged in parallel rows and columns. In the depicted embodiment, the backplane 36 defines MPO style fiber optic adapters 38 that are configured to receive and couple MPO style fiber optic connectors. Each of the cassettes 10 supported by the trays 26 of the chassis 12 are configured to be optically coupled to the backplane 36 for receiving input signals.

Still referring to FIGS. 1-2, in the depicted embodiment of the chassis 12, a pair of cable management structures 40 in the form of cable rings are provided at the front 18 of the chassis 12 at each of the right and left walls 28, 30. The cable rings 40 are configured to manage cables leading to or away from the optical cassettes 10 that are housed within the chassis 12. Further details relating to cable management structures similar to cable rings 40 are described and illustrated in International Publication No. WO 2015/040211, the entire disclosure of which is incorporated herein by reference.

A front door 42 of the chassis 12 extends between the right and left walls 28, 30 and is pivotally opened to provide access to the connection locations defined by the optical cassettes 10 within the chassis 12. Further details relating to the door 42 and a hinge arrangement that allows the door 42 to be movable between a fully closed position and a fully open position that is at 180 degrees from the fully closed position are described and illustrated in International Publication No. WO 2016/012295, the entire disclosure of which is incorporated herein by reference. The hinge mechanism 44 of the door 42 allows the door to be fully opened, enabling extension or removal of the pull-out trays/blades 26 housed within the chassis 12.

Figure 3:
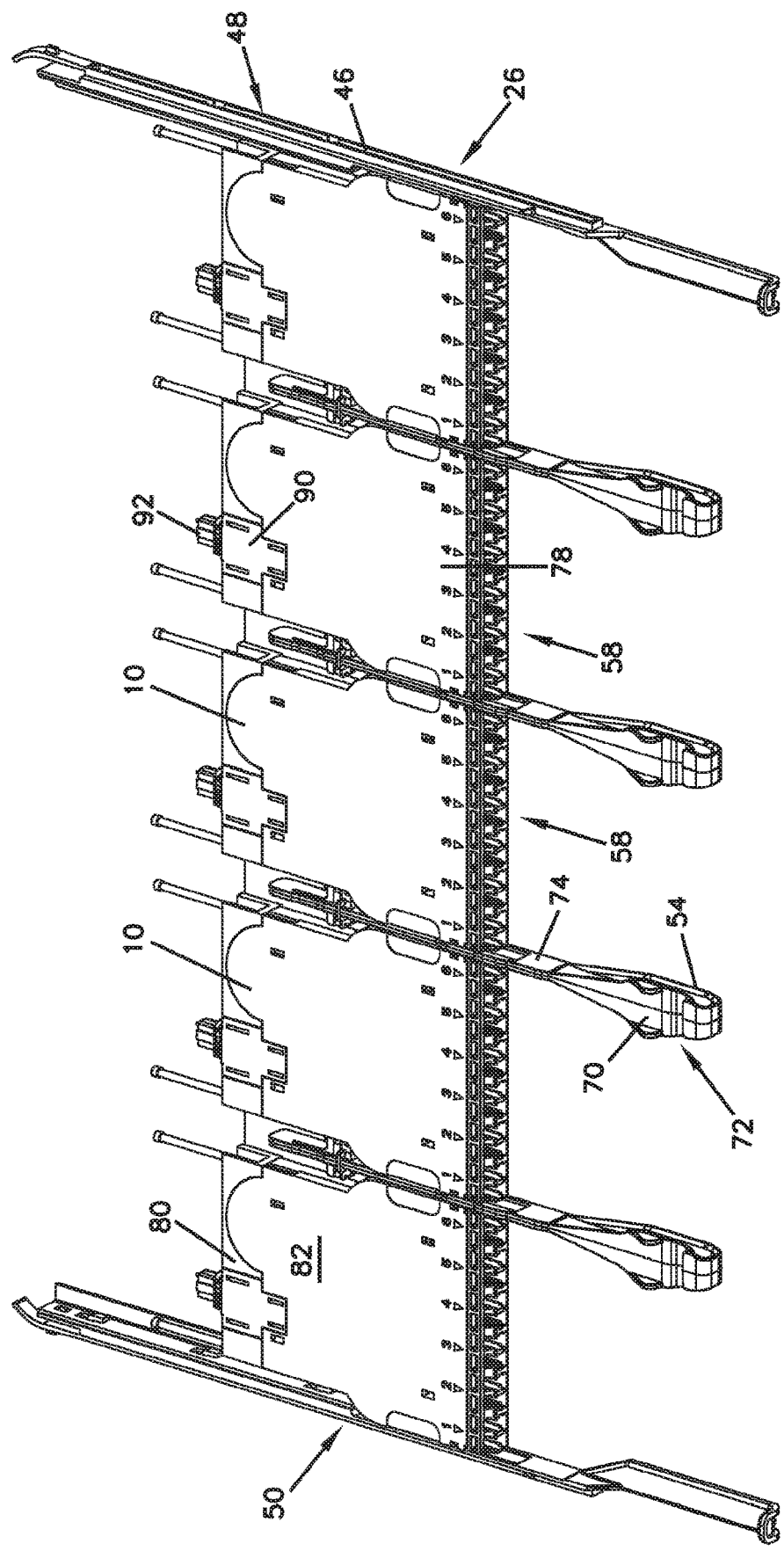
FIG. 3 illustrates one of the slidable trays/blades of the system of FIGS. 1-2 in isolation removed from the chassis.
Figure 4:
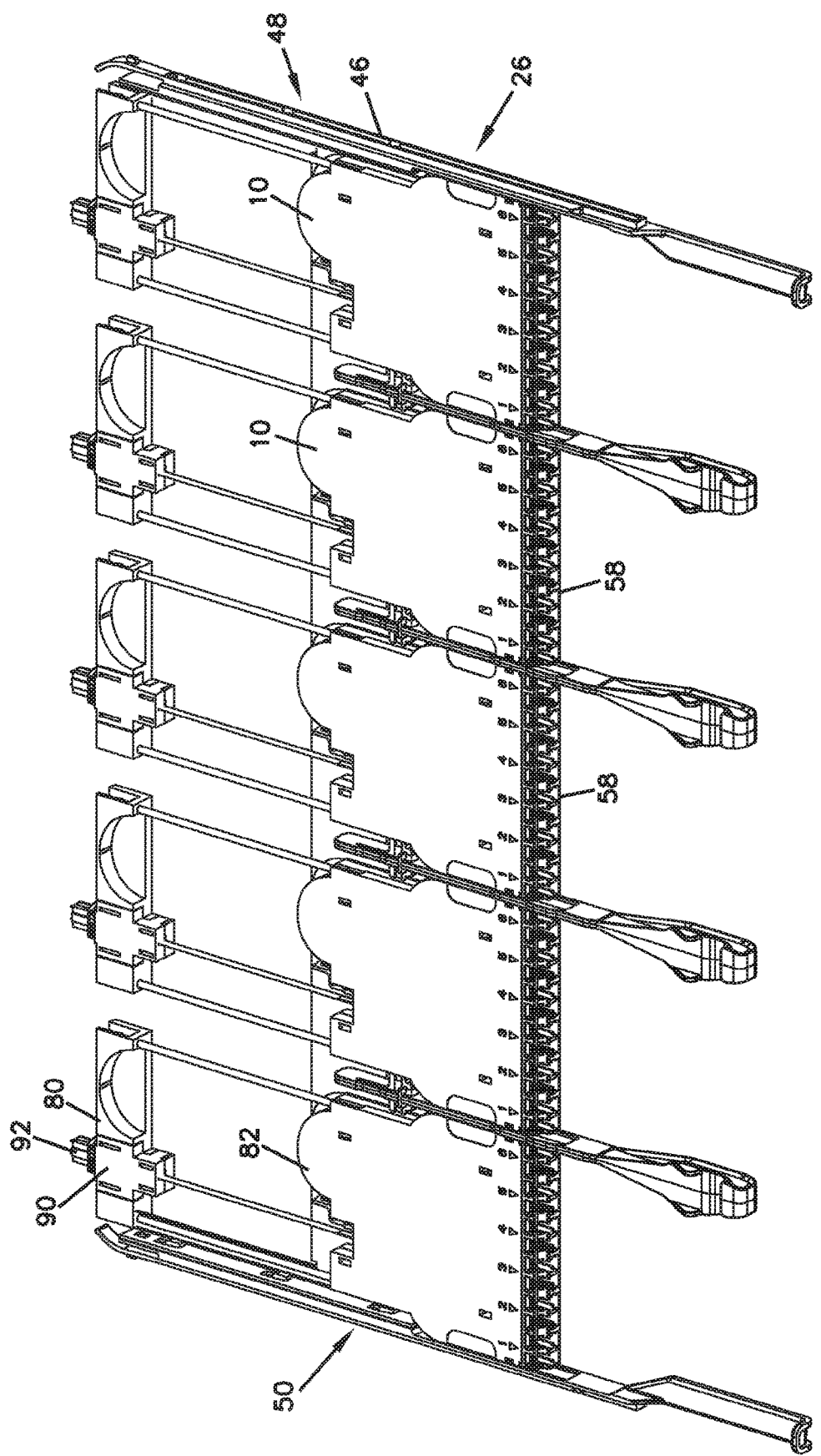
FIG. 4 illustrates the tray/blade of FIG. 3 with the telescopically movable portions of the cassettes in an extended position.

Still referring to FIGS. 1-2, in the depicted embodiment, the chassis 12 is configured to have a height of two standard rack units (2RU). Other heights are possible. Within the 2RU height, the chassis 12 is configured to house eight blades or trays 26 that are mounted in a vertically stacked arrangement within the chassis 12. One of the blades 26 (populated with the cassettes 10 of the present disclosure) is shown in isolation in FIGS. 3-4.

As shown, each blade 26 defines a generally planar configuration with slide portions 46 defined at each of the right and left sides 48, 50 of the blade 26. And, as shown in FIGS. 1-2, at each of the right and left walls 28, 30, the chassis 12 defines mounting slots 52 for receiving the slide portions 46 of the blades 26. The slide portions 46 of the blades 26 and the mounting slots 52 of the chassis walls 28, 30 are configured to cooperate such that positive stops are provided for predetermined positions of the blades 26 with respect to the chassis 12. For example, a positive stop may be provided when the blade 26 is at a neutral (retracted) position within the chassis 12. Once the blade 26 is pulled out by a user toward an extended position, another positive stop may be provided at the fully extended position to keep the blade 26 coupled to the chassis 12. If the blade 26 needs to be fully removed from the chassis 12, the slide portions 46 of the blade 26 may be flexed inwardly to remove tabs defined by the slide portions 46 from notches defined within the mounting slots 52 of the chassis 12, and the blade 26 pulled out.

Further details relating to the slide mechanism provided between the chassis 12 and the individual trays/blades 26 and the operation thereof is described and illustrated in International Publication No. WO 2015/040211, the entire disclosure of which has been incorporated herein by reference.

As noted above, in the depicted telecommunications system 14, the blades/trays 26 of the chassis 12 are used for supporting telecommunications devices in the form of fiber optic cassettes 10 that are for relaying fiber optic signals. Cable management devices 54 may be positioned between each of the cassettes 10 for managing cables extending from the front sides 60 of the cassettes 10. In the depicted embodiment, each tray/blade 26 is sized to hold five fiber optic cassettes 10 along a row within the 19-inch standard rack spacing. One example of a cassette 10 that is configured for mounting on the chassis 12 is shown in isolation in FIGS. 5-9, further details of which will be described below.

According to one example embodiment, the depicted cassette 10 is configured to provide twelve connection locations 58 defined by standard LC format adapters at the front 60 of the cassette 10, as will be discussed in further detail below. The LC adapters 58 may be formed as part of an adapter block 62. With five cassettes 10 located on each blade 26, and with eight blades 26 located on each chassis 12, the chassis 12 can accommodate a density of 480 standard LC format connections within a 2RU rack spacing. A similar 1RU chassis 12 can, thus, accommodate 240 standard LC format connections within that 1RU spacing. Although, the density noted provides the maximum capacity for the system 14, other connection location numbers may be utilized on the chassis 12. For example, in other embodiments, the chassis 12 may utilize 180 standard LC format connections within a 1RU space. In yet other embodiments, the chassis may utilize 210 standard LC format connections within a 1RU space if the chassis is large enough to have a 2RU or greater capacity.

Figure 5:
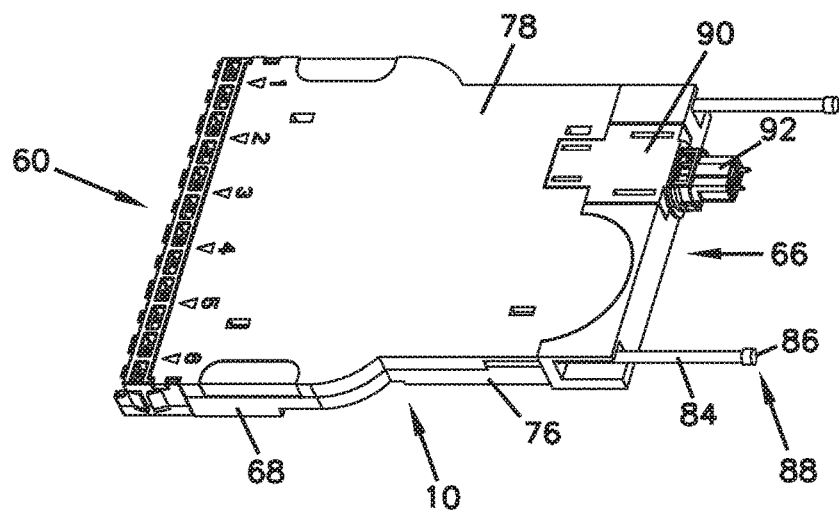
FIG. 5 illustrates one of the fiber optic cassettes of the system of FIGS. 1-2 in isolation removed from one of the trays/blades of the system.
Figure 6:
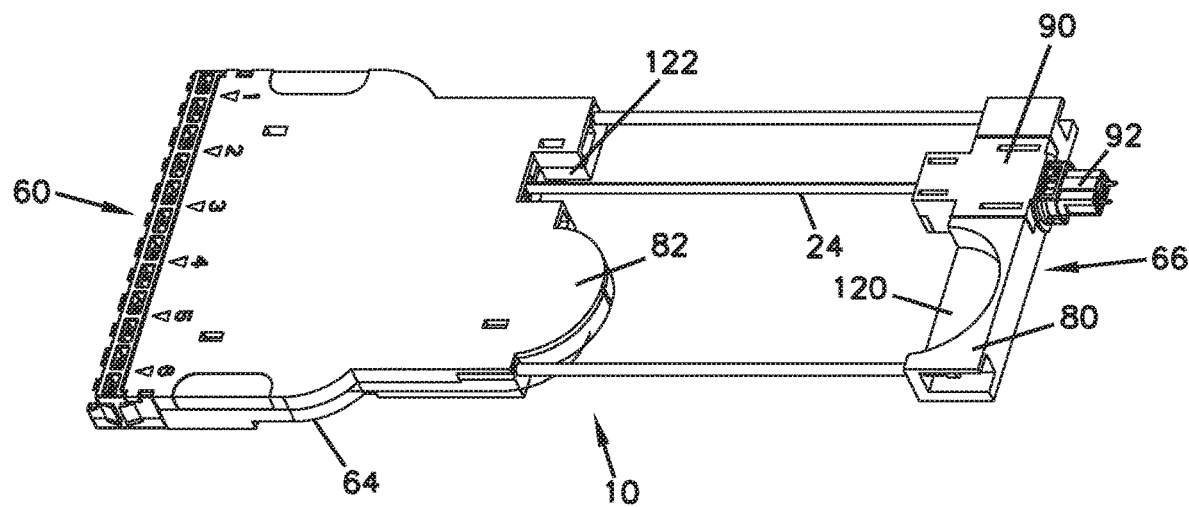
FIG. 6 illustrates the cassette of FIG. 5 with the telescopically movable portion of the cassette in an extended position.

Now referring specifically to FIGS. 5 and 6, the blades 26 and the cassettes 10 are configured such that portions (e.g., at the bottom) of the cassettes 10 are configured to receive portions of the blades 26 to decrease the overall thickness of the mounted unit. Each cassette 10 defines a notched area 64 that extends a majority of the length of the cassette 10, essentially from where the adapter block 62 is positioned to the rear 66 of the cassette 10. As such, according to one example embodiment, when a cassette 10 is mounted on a blade 26, the blade 26 lies flush with the cassette body 68, and the thickness of the blade 26 is accommodated by the notched area 64. As such, when a cassette 10 is mounted on the blade 26, the cassette 10 can abut and lie against the blade 26 without substantially adding to the overall thickness of the unit. According to one example embodiment, the entire thickness of the blade 26 is accommodated by the notched area 64. According to another example embodiment, at least a portion of the thickness of the blade 26 is accommodated by the notched area 64. According to yet another example embodiment, at least a portion of the notched area 64 is used in accommodating the thickness of the blade 26 such that the blade body does not add to the maximum overall height of the cassette 10.

As noted above, this configuration allows four cassette-loaded blades 26 to be mounted in a vertical stack in a 1RU rack space and eight cassette-loaded blades 26 to be mounted in a vertical stack in a 2RU rack space.

The cable managers 54, discussed above, located between each fiber optic cassette 10, help preserve the high density provided by the system 14. As depicted, each cable manager 54 defines wider portions 70 at the front ends 72 thereof that transition to a rear section 74 having a thinner profile. The wider portions 70 define split-ring configurations for receiving and retaining cables extending to and from the cassettes 10. The thinner profile sections 74 are positioned between the cassettes 10 when the cable managers 54 are mounted to the blades 26 to preserve the overall density within a 19-inch rack.

The thin portions 74 of the cable managers 54 allow five cassettes 10, each holding up to twelve connections, to be mounted on blades 26 along a horizontal stack within the width defined by a standard 19-inch telecommunications rack. And, with four cassette-loaded blades 26 mounted in a vertical stack in a 1RU rack space, the system 14 of the present disclosure achieves significant connectivity densities.

As previously noted, according to one example embodiment, a maximum capacity of 480 connections each using a standard LC connector footprint are achieved in a standard 19-inch telecommunications rack within a 2RU rack space. According to another example embodiment, a maximum capacity of 240 connections each using a standard LC connector footprint are achieved in a standard 19-inch telecommunications rack within a 1RU rack space, as noted above.

The removability of the cassettes 10 provides significant flexibility in configuring the connectivity of system 14 as desired. For example, the blades 26 may be populated and the cassettes 10 arranged differently depending upon the densities needed and the different types and sizes of cabling used (e.g., 12 fiber 10-gig cabling, 24 fiber 40-gig cabling, or 48 fiber 100-gig cabling).

The removability of the cassettes 10 and the blades 26 of the systems 14 of the present disclosure allows different arrangements to be provided depending upon the connectivity need. Cassettes 10 can be added for increasing connectivity, removed for decreasing connectivity, or replaced if needing repair. The connection locations can be varied both in number and type. For example, the types of optical equipment (e.g., the types of cassettes 10) can be varied within each blade 26 or within the different levels within a chassis 12. Certain mounting locations of the blades 26 can be left unpopulated and used for other purposes such as labeling, etc.

Now referring to FIGS. 5-9 in general, the parts that make up the body 68 of one example cassette 10 having inventive aspects in accordance with the present disclosure are shown. The cassette body 68 is defined by a base 76 and a cover 78. The cassette body 68 defines a rear end 66 and a front end 60. As shown, an adapter block 62 is positioned at the front end 60 of the body 68. The adapter block 62 may be formed as an integral part of the base 76, or may be provided as a removable structure that is captured thereagainst by the cover 78. Similar fiber optic adapter blocks 62, including those that might have staggered adapter configurations, are described and illustrated in further detail in U.S. Pat. No. 9,075,203, which patent is incorporated herein by reference in its entirety.

The base 76 of the cassette body 68, as will be described in further detail below, defines a fixed portion 80 and a movable portion 82 that is configured to telescopically slide with respect to the fixed portion 80. The two portions 80, 82 of the base 76 facilitate management of the cable 24 that is carrying the fibers supported by the cassette 10. A pair of slide rods 84 are provided for guiding and supporting the slidably movable portion 82 with respect to the fixed portion 80.

As shown in FIGS. 5-9, the slide rods 84 extend through both the fixed portion 80 and the movable portion 82 of the base 76 of the cassette body 68. The slide rods 84 are configured such that they may also be slidable with respect to the base 76 of the cassette body 68. Each slide rod 84 defines a stop flange 86 at a rear end 88 thereof that can interact with the fixed portion 80 of the base 76 to prevent removal of the slide rod 84 from the fixed portion 80. When the movable portion 82 of the base 76 starts to telescopically slide with respect to the fixed portion 80, the slide rod 84 may also slidably move until the stop flange 86 abuts the fixed portion 80 of the base 76, at which point, the movable portion 82 starts sliding with respect to the rod 84.

According to certain embodiments, portions of the cassette body 68 may be formed from polymeric materials. The slide rods 84 may be formed from a metallic material for further rigidity.

The fixed portion 80, as will be described in further detail below, defines a fiber optic adapter 90 (e.g., in the form of an MPO style adapter) at the rear end 66 of the cassette body 68. A fiber optic connector 92 (in the form of an MPO connector) extends rearwardly from the MPO style adapter 90. The fiber optic connector 92 is configured for coupling to the adapters 38 provided at the backplane 36 of the chassis 12 for inputting signals into the cassettes 10.

The movable portions 82 of the cassette bodies 68 are coupled to and supported by the blades 26 of the chassis 12 and are configured to move with those blades 26. As such, when the fixed portion 80 of each cassette 10 is physically and optically coupled to the backplane 36 defined by the chassis 12, the movable portion 82 moves with the trays/blades 26 as the blades/trays 26 are pulled out from the chassis 12.

Still referring to FIGS. 5-9, the fiber optic connector 92 extending rearward from the cassette 10 provides a signal entry location for the cassette 10. And, the individual connector ports defined by the adapters 58 of the adapter block 62 at the front 60 of the cassette 10 provide signal exit locations.

A ribbon cable 24 terminated to and extending from the connector 92 at the signal entry location includes a plurality of fibers that carry signals being relayed toward the adapters 58 at the front 60 of the cassette 10. The cassette 10 is configured such that the ribbon cable 24 moves from a position where it extends out of the cassette body 68 when the movable portion 82 of the base 76 has been telescopically pulled out (shown in FIGS. 8-9) to a retracted and managed position when the movable portion 82 has been retracted back to the neutral position (shown in FIG. 7). The ribbon cable 24 enters the movable portion 82 of the base 76 through an opening 94 adjacent the rear end 99 of the movable portion 82. Once the ribbon cable 24 enters the movable portion 82, it is guided toward (with bend radius protection) and managed internally via spools 96, 98 within the interior 100 defined by the base 76. When the movable portion 82 is retracted via the trays/blades 26, the ribbon cable 24 can coil and be managed within the interior 100 defined by the movable portion 82 of the base 76.

Figure 7:
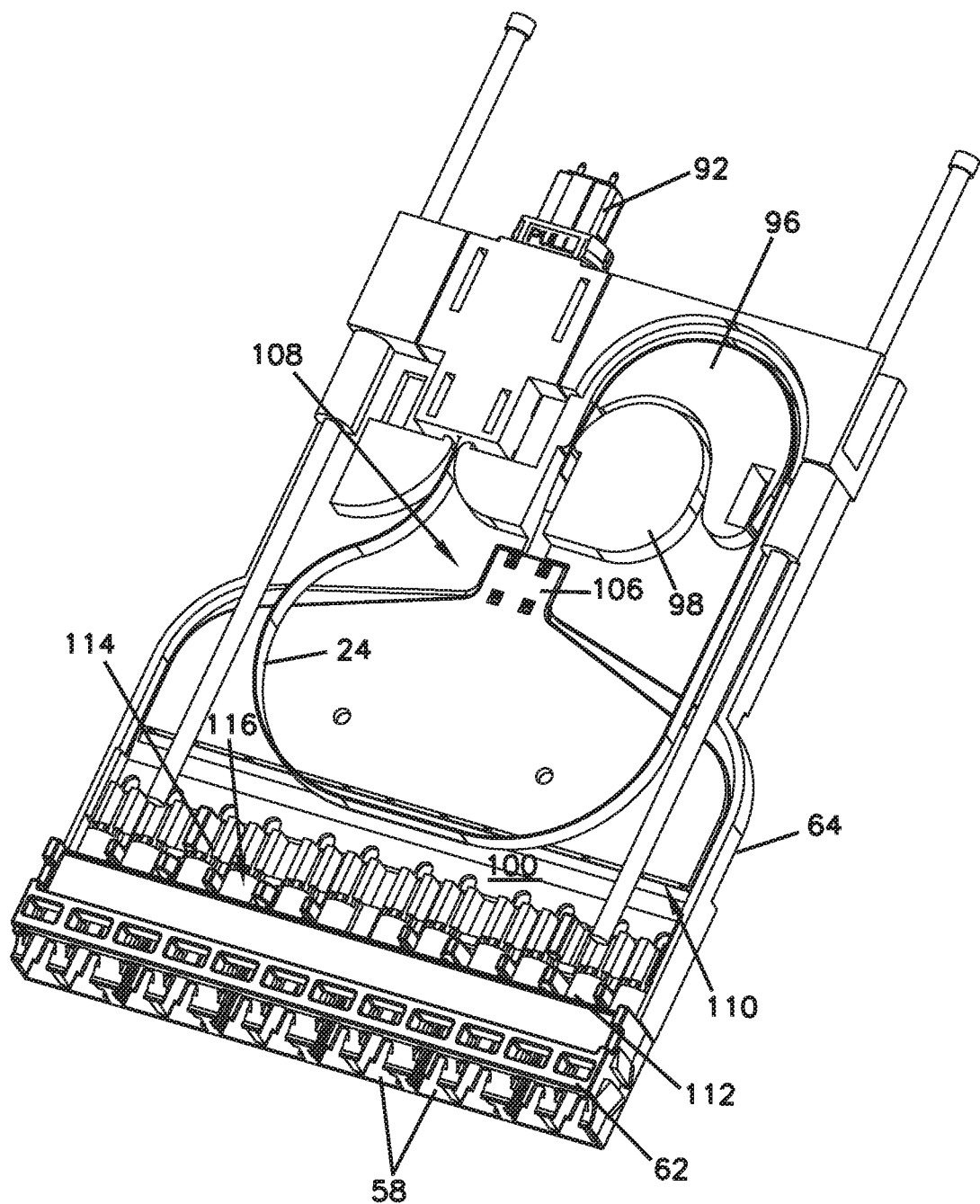
FIG. 7 illustrates the cassette of FIG. 5 with a cover thereof removed from the rest of the cassette body to illustrate the internal features thereof, wherein a ribbon cable is in a retracted position, being managed internally within the cassette body.
Figure 8:
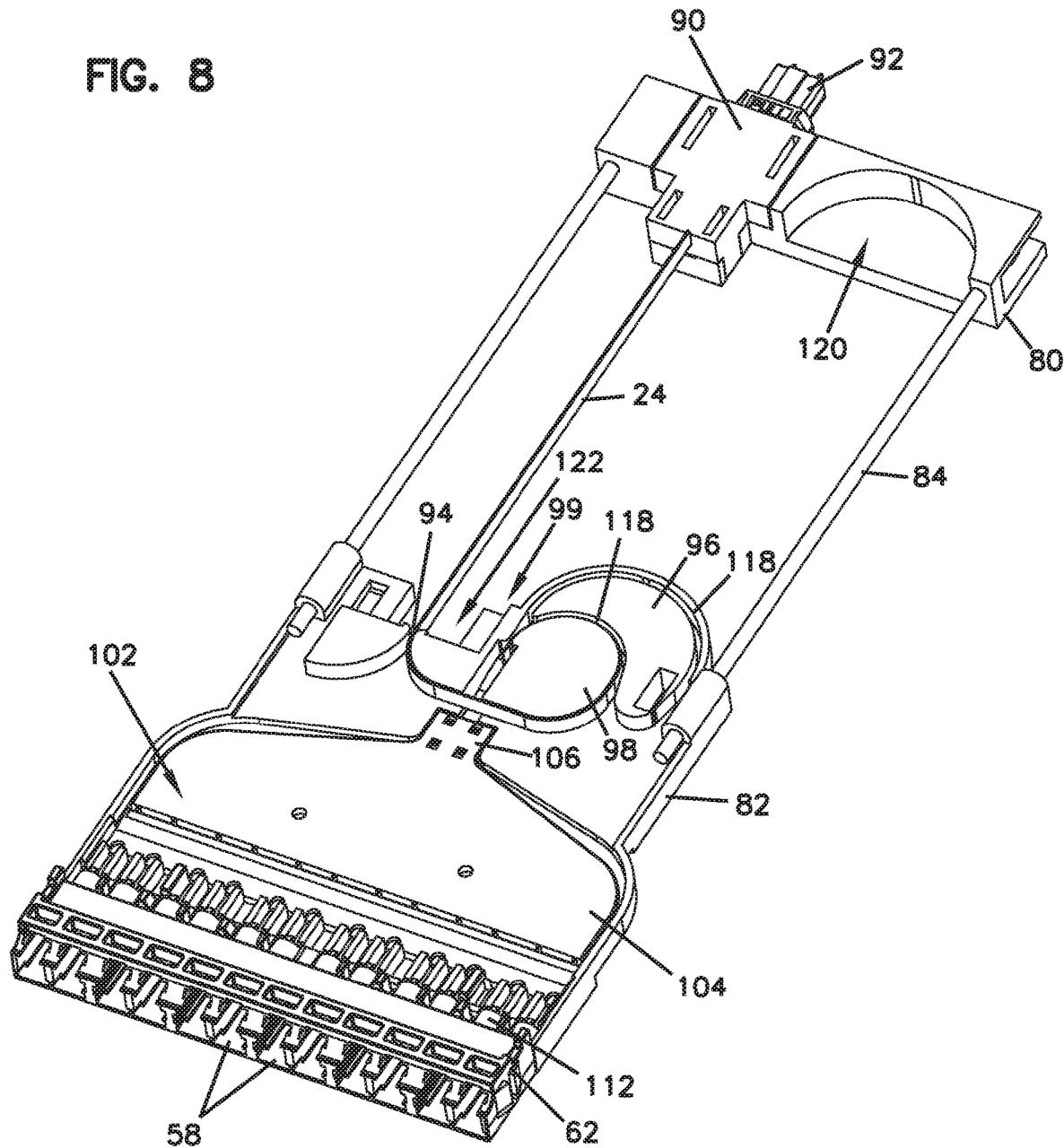
FIG. 8 illustrates the cassette of FIG. 7 with the telescopically movable portion of the cassette in an extended position, with the ribbon cable extending out of the cassette body.
Figure 9:
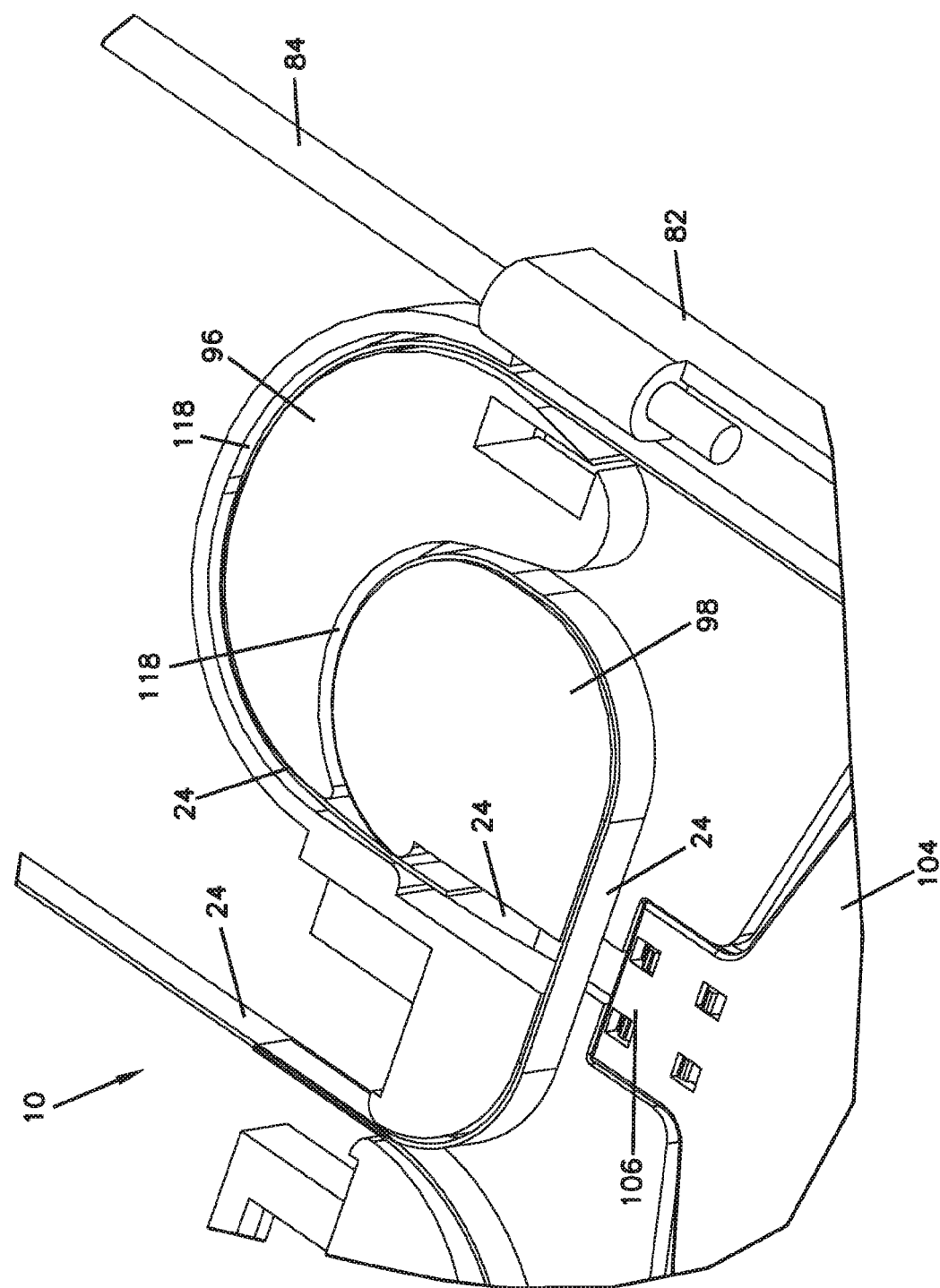
FIG. 9 illustrates a close-up view of a portion of the cassette of FIG. 8.

As shown in FIGS. 7-9, the base 76 defines a large spool 96 surrounding a small spool 98 for management of the ribbon cable 24. The purpose of the two spools 96, 98 will be described in further detail below.

Still referring to FIGS. 5-9, according to certain example embodiments, as shown in the depicted cassette 10, within an interior 100 defined by the cassette body 68, the cassette 10 may utilize a transitional fiber array 102. According to certain embodiments, such a transitional fiber array 102 may or may not include a flexible substrate forming a flexible optical circuit for the transition of the fibers. In the depicted embodiment, the fiber array 102 is configured to branch out the fibers of the ribbon cable 24 and relay the fibers toward the adapters 58 positioned at the front 60 of the cassette 10.

In FIGS. 7-9, the fiber array 102 is shown as being supported by a rigid polymeric insert 104 that has been placed within the base 76 of the cassette body 68. Further details relating to the polymeric insert 104 and the method for manufacturing thereof are described and illustrated in U.S. Patent Publication No. 2016/0041357, the entire disclosure of which is incorporated herein by reference.

A rigid insert 104, as the one shown in FIGS. 7-9, may define individual channels at a front end of the insert 104 where fibers can transition to a fiber consolidation point 106 at a rear end 108 of the insert 104. The channels may define curved rear portions. The curvature of the channels may be designed to protect the minimum bend radius requirements of the fibers as the fibers extend rearwardly from the front end 110 to the rear end 108 of the insert 104. At the fiber consolidation point 106 at the rear end 108 of the insert 104, the fiber optic array 102 may define a clamp for clamping the consolidated fibers. The fiber clamp may be configured to keep the consolidated fibers in a given arrangement as they transition between the ribbon cable 24 and the branched fiber array 102.

As noted above, the polymeric insert 104, rather than being provided as a rigid structure, may also be replaced with a flexible substrate to provide a flexible optical circuit. Flexible optical circuits are passive optical components that comprise one or more (typically, multiple) optical fibers embedded on a flexible substrate, such as a Mylar™ material or other flexible polymer substrate. Commonly, although not necessarily, one end face of each fiber is disposed adjacent one longitudinal end of the flexible optical circuit substrate, and the other end face of each fiber is disposed adjacent the opposite longitudinal end of the flexible optical circuit substrate. The fibers extend past the longitudinal ends of the flexible optical circuit (commonly referred to as pigtails) so that they can be terminated to optical connectors, which can be coupled to fiber optic cables or other fiber optic components through mating optical connectors.

Flexible optical circuits essentially comprise one or more fibers sandwiched between two flexible sheets of material, such as Mylar™ material or another polymer. An epoxy may be included between the two sheets in order to adhere them together. Alternately, depending on the sheet material and other factors, the two sheets may be heated above their melting point to heat-weld them together with the fibers embedded between the two sheets.

In the depicted embodiment of the cassette 10, even though the fiber array 102 is shown to be supported by a rigid polymeric insert 104, in other embodiments, the cassette 10 may utilize a flexible circuit defined by a flexible substrate. Further details relating to cassettes utilizing flexible optical circuits are described and illustrated in WO 2014/052441 and WO 2014/052446, the entire disclosures of which are incorporated herein by reference.

The use of flexible optical circuits within the fiber optic cassettes 10 of the present disclosure may provide certain advantages. For example, the substrate of a flexible optical circuit may be mechanically flexible, being able to accommodate tolerance variations in different cassettes 10, such as between connector ferrules and the housings that form the cassettes 10. The flexibility of the optical circuits also allow for axial movement in the fibers to account for ferrule interface variation. Also, providing a supportive substrate 104, either rigid or flexible, within which the fibers are positionally fixed, allows a designer to optimize the fiber bend radius limits and requirements in configuring the cassettes 10, thus, achieving reduced dimensions of the cassettes 10. The bend radius of the fibers can thus be controlled to a minimum diameter. By utilizing optical fibers such as bend insensitive fibers (e.g., 8 mm bend radius) in combination with a rigid insert 104 or a flexible substrate that fixes the fibers in a given orientation, allowing for controlled bending, small form cassettes 10 may be produced in a predictable and automated manner. Manual handling and positioning of the fibers within the cassettes 10 may be reduced and eliminated through the use of such fiber arrays 102.

According to one example embodiment, in the fiber optic cassette 10 of the present disclosure, the fiber array 102 is provided between the ribbon cable 24 and the adapter block 62 located at the front 60 of the cassette 10. The array 102 separates and relays the individual fibers of the ribbon cable 24 toward the adapter block 62. As discussed in WO 2014/052441, WO 2014/052446, and U.S. Patent Publication No. 2016/0041357, the entire disclosures of which have been incorporated herein by reference, the array 102 can be used to transition optical fibers between a standard multifiber ribbon cable 24 to a plurality of non-conventional connectors 112 at the opposite front end 60 of the cassette body 68. If the array 102 uses a flexible substrate defining a flexible circuit, portions of that substrate supporting the fibers may be physically inserted into the non-conventional connectors 112.

It should be noted that the term "non-conventional connector" may refer to a fiber optic connector that is not of a conventional type such as an LC or SC connector and one that has generally not become a recognizable standard footprint for fiber optic connectivity in the industry.

As described and shown in WO 2014/052441, WO 2014/052446, and U.S. Patent Publication No. 2016/0041357, the entire disclosures of which have been incorporated by reference, the non-conventional connectors 112 that are positioned adjacent the front 60 of the cassette 10 may each defines a hub mounted over a ferrule. A split sleeve may also be provided for ferrule alignment between the hub and ferrule of each non-conventional connector 112 and a ferrule of another mating connector that enters the cassette 10 from the front 60. Each ferrule may be configured to terminate one of the fibers extending out from the insert 104. The fiber pigtails extending out from a front end 110 of the insert 104 may be individually terminated to the ferrules to be positioned at the front 60 of the cassette 10.

The cassette 10 may define pockets 114 at the rear end 116 of the adapter block 62 that match the exterior shape of the ferrule hubs (e.g., having square footprints), wherein the pockets 114 may be configured to fully surround the ferrule hubs. Via the adapter block 62, the cassette 10 is ready to receive fiber optic connections. Mating conventional connectors entering the cassette 10 from the front 60 of the cassette 10 may be connected through fiber optic adapters 58 that are defined by the adapter block 62.

The elimination of conventional mating connectors inside the cassette 10 may significantly reduce the overall cost by eliminating the skilled labor normally associated with terminating an optical fiber to a connector, including polishing the end face of the fiber and epoxying the fiber into the connector. It further allows the fiber optic interconnect device such as the optical cassette 10 to be made very thin.

As noted, further details relating to fiber optic cassettes including such non-conventional connectors 112 are described and illustrated in the above-incorporated WO 2014/052441, WO 2014/052446, and U.S. Patent Publication No. 2016/0041357.

Referring to FIGS. 5-9, for the cassette 10 shown therein, a signal entry location may be provided by an MPO style adapter 90 and an MPO style connector 92 that is within the adapter 90 at the fixed portion 80 of the base 76 of the cassette body 68. The ribbon cable 24 terminated to the MPO connector 92 carries the fibers that are relayed to the movable portion 82 of the base 76 of the cassette body 68. From the ribbon cable 24, the fibers are transitioned via a fiber optic array 102 that is supported by a polymeric insert 104 that is placed within the cassette body 68. The pigtails extending forward from the polymeric insert 104 may be used to form the non-conventional connectors 112 as noted above. The adapter block 62 at the front end 60 of the cassette body 68 may be configured to mate the non-conventional connectors 112 positioned at a rear end 116 of the block 62 to conventional type connectors (e.g., LC format) coming in from the front 60 of the cassette 10.

Regarding the management of the ribbon cable 24 within the cassette body 68 and the two spools 96, 98, the large spool 96 is used when the fibers carried by the ribbon cable 24 are initially terminated within the cassette 10, the ribbon cable 24 extending from the MPO connector 92 provided within the MPO adapter 90 at the fixed portion 80 to the polymeric insert 104 within the movable portion 82.

The small spool 98 is used if, for any reason, the ribbon cable 24 has to be re-terminated. When re-terminating a ribbon cable 24 such as the one used with the cassettes 10 of the present disclosure, the cable 24 is cut and the technician can normally lose 20-30 mm of the cable length. The cassette 10 of the present disclosure is designed such that the small spool 98 defines a fiber path 118 that surrounds the spool 98 that is about 30-40 mm shorter than that defined by the large spool 96. Thus, using the small loop or path 118, after a re-termination process, ensures that the ribbon cable 24 will still be able to extend to its fully extended length when the telescopically movable portion 82 is pulled out. The difference in length between the path 118 surrounding the large loop 96 (which is initially used when assembling the cassette 10) and the path 118 surrounding the small loop 98 is large enough to make up the length that is lost in re-terminating the ribbon cable 24. Thus, the cooperation and the positioning of the two spools 96, 98 provides a guide to a technician that may be re-terminating the ribbon cable 24. The two spools 96, 98 retain the proper functioning of the cassette 10 by preventing or limiting any stress that might be put on the fibers of the ribbon cable 24 via the telescoping movement of the cassette 10 if such a guide was not used. It should be noted that in FIG. 7, the ribbon cable 24 is illustrated in an initially terminated configuration where the large spool 96 is used for managing the cable 24. In FIG. 8, the cassette 10 is shown when a ribbon cable 24 has been re-terminated, where the cable 24 is now managed by the small spool 98. FIG. 9 is a close-up view of a portion of the cassette 10 of FIG. 8, wherein the difference between the fiber paths 118 between the two spools 96, 98 is illustrated schematically.

As shown in FIGS. 5-9, the fixed portion 80 of the base 76 defines a notch 120 for accommodating the spools 96, 98 formed within the movable portion 82 of the base 76. The movable portion 82 of the base 76 also defines a notch 122 for accommodating a portion of the fiber optic adapter 90 provided on the fixed portion 80 of the base 76. The notches 120, 122 provide a flush fit when the movable and the fixed portions 82, 80 of the base 76 of the cassette body 68 are brought together.

Although in the foregoing description, terms such as "top," "bottom," "front," "back," "right," "left," "upper," and "lower" were used for ease of description and illustration, no restriction is intended by such use of the terms. The telecommunications devices described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

LIST OF REFERENCE NUMERALS AND CORRESPONDING FEATURES

10—Fiber optic cassette
12—Telecommunications chassis
14—Telecommunications system
16—Rear of chassis
18—Front of chassis
24—Ribbon cable
26—Tray/blade
28—Right wall of chassis
30—Left wall of chassis
32—Mounting flange
34—Back wall of chassis
36—Backplane
38—Connection location/fiber optic adapter
40—Cable management structures/cable rings
42—Door
44—Hinge mechanism
46—Slide portion of blade
48—Right side of blade
50—Left side of blade
52—Mounting slot
54—Cable management device
58—Connection location/fiber optic adapter
60—Front end of cassette
62—Adapter block
64—Notched area
66—Rear end of cassette
68—Cassette body
70—Wider portion of cable manager
72—Front end of cable manager
74—Thin portion of cable manager
76—Base of cassette body
78—Cover of cassette body
80—Fixed portion of base
82—Movable portion of base
84—Slide rod
86—Stop flange
88—Rear end of slide rod
90—Fiber optic adapter
92—Fiber optic connector
94—Opening
96—Large spool
98—Small spool
99—Rear end of movable portion of base
100—Interior
102—Fiber optic array
104—Polymeric insert
106—Fiber consolidation point
108—Rear end of insert
110—Front end of insert
112—Non-conventional connector
114—Pocket
116—Rear end of adapter block
118—Fiber path
120—Notch
122—Notch

What is claimed is:

1. A telecommunications system comprising:
a chassis defining a front, a rear, and a plurality of first signal connection locations;
a plurality of cassettes housed within the chassis, each cassette including a cassette body defining a fixed portion that is coupled to one of the first signal connection locations provided on the chassis and a movable portion that is configured for movement in a direction extending from the front to the rear of the chassis;
wherein each cassette defines a plurality of second signal connection locations;
wherein a cable extending between the fixed portion and the movable portion is moves when the movable portion of the cassette body moves with respect to the fixed portion, wherein the cable is managed by a first cable management spool within the cassette body when the movable portion is pushed rearwardly with respect to the fixed portion.

2. The telecommunications system of claim 1, wherein the first and second signal connection locations are configured for relaying fiber optic signals.

3. The telecommunications system of claim 2, wherein the first and second signal connection locations are defined by fiber optic adapters.

4. The telecommunications system of claim 3, wherein the first signal connection locations are provided by MPO style fiber optic adapters and the second signal connection locations are provided by LC type fiber optic adapters.

5. The telecommunications system of claim 1, wherein the plurality of cassettes are supported by blades that are slidably mounted to the chassis, the blades slidable in a direction extending from the front to the rear of the chassis.

6. The telecommunications system of claim 1, wherein the body of each cassette defines a notched area for receiving a portion of the blade on which the cassette is mounted such that the blade does not increase the overall maximum height defined by the cassette body.

7. The telecommunications system of claim 3, wherein the fixed portion of the cassette body includes a fiber optic connector that extends from the cassette body that is optically coupled to one of the fiber optic adapters defining the first signal connection locations.

8. The telecommunications system of claim 7, wherein the cable is a fiber optic ribbon cable that is terminated to the fiber optic connector and that carries a plurality of fibers leading to the second signal connection locations of the cassette.

9. The telecommunications system of claim 8, wherein the cassette includes a transition fiber array defined by a polymeric substrate that supports the plurality of fibers extending from the ribbon cable toward the second signal connection locations of the cassette.

10. The telecommunications system of claim 9, wherein the polymeric substrate is formed from a flexible material.

11. The telecommunications system of claim 9, wherein the fiber optic adapters defining the second signal connection locations are each configured to mate an exterior fiber optic connector to a fiber optic connector that is terminated to one of the fibers extending from the ribbon cable and supported by the polymeric substrate.

12. The telecommunications system of claim 1, wherein the movable portion of the cassette body defines a back-up second cable management spool that provides for a shorter-length cable path measured from one of the respective first signal connection locations to any of the second signal connection locations within a given cassette as compared to a cable path provided by the first cable management spool, the back-up second cable management spool configured for use when re-terminating the cable.

13. A fiber optic cassette comprising:
a cassette body defining a fixed portion that is configured to be fixedly coupled to a telecommunications chassis, wherein the fixed portion defines a fiber optic connector for optically mating with a fiber optic adapter of the chassis and a movable portion that moves with respect to the fixed portion; and
a plurality of fiber optic connection locations defined on the movable portion of the cassette body, wherein a cable extending from the fixed portion toward the movable portion moves when the movable portion of the cassette body moves with respect to the fixed portion, wherein the cable is managed by a first cable management spool within the cassette body when the movable portion and the fixed portion are brought together.

14. The fiber optic cassette of claim 13, wherein the cable is a ribbon cable terminated to the fiber optic connector and carries a plurality of fibers that extend to the fiber optic connection locations defined on the movable portion of the cassette body.

15. The fiber optic cassette of claim 14, wherein the cassette includes a transition fiber array defined by a polymeric substrate that supports the plurality of fibers extending from the ribbon cable toward the fiber optic connection locations of the movable portion of the cassette body.

16. The fiber optic cassette of claim 15, wherein the polymeric substrate is formed from a flexible material.

17. The fiber optic cassette of claim 15, wherein the fiber optic connection locations of the cassette are defined by fiber optic adapters that are each configured to mate an exterior fiber optic connector to a fiber optic connector that is terminated to one of the fibers extending from the ribbon cable and supported by the polymeric substrate.

18. The fiber optic cassette of claim 13, wherein the movable portion of the cassette body defines a back-up second cable management spool that provides for a shorter-length cable path measured from the fiber optic connector to any of the fiber optic connection locations defined on the movable portion of the cassette body as compared to a cable path provided by the first cable management spool, the back-up second cable management spool configured for use when re-terminating the cable.

* * * * *

UNITED STATES PATENT AND TRADEMARK OFFICE
CERTIFICATE OF CORRECTION

PATENT NO. : 10,678,011 B2
APPLICATION NO. : 16/377783
DATED : June 9, 2020
INVENTOR(S) : Kamlesh G. Patel Page 1 of 1

It is certified that error appears in the above-identified patent and that said Letters Patent is hereby corrected as shown below:

In the Claims

Column 12, Line 48, Claim 1: "portion is moves" should read --portion moves--

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*